W. H. COOK.
FERTILIZER-DISTRIBUTER.

No. 169,523.  Patented Nov. 2, 1875.

UNITED STATES PATENT OFFICE.

WILLIAM H. COOK, OF MERIDIAN, MISSISSIPPI.

IMPROVEMENT IN FERTILIZER-DISTRIBUTERS.

Specification forming part of Letters Patent No. 169,523, dated November 2, 1875; application filed August 26, 1875.

*To all whom it may concern:*

Be it known that I, WILLIAM HENRY COOK, of Meridian, in the county of Lauderdale and in the State of Mississippi, have invented certain new and useful Improvements in a Cotton and Corn Planter and Fertilizer-Distributer; and do hereby declare that the following is a full, clear, and exact description thereof, reference being had to the accompanying drawings, and to the letters of reference marked thereon, making a part of this specification.

The nature of my invention consists in the construction and arrangement of a corn and seed planter and fertilizer-distributer, as will be hereinafter more fully set forth.

In order to enable others skilled in the art to which my invention appertains to make and use the same, I will now proceed to describe its construction and operation, referring to the annexed drawing, in which—

Figure 1:
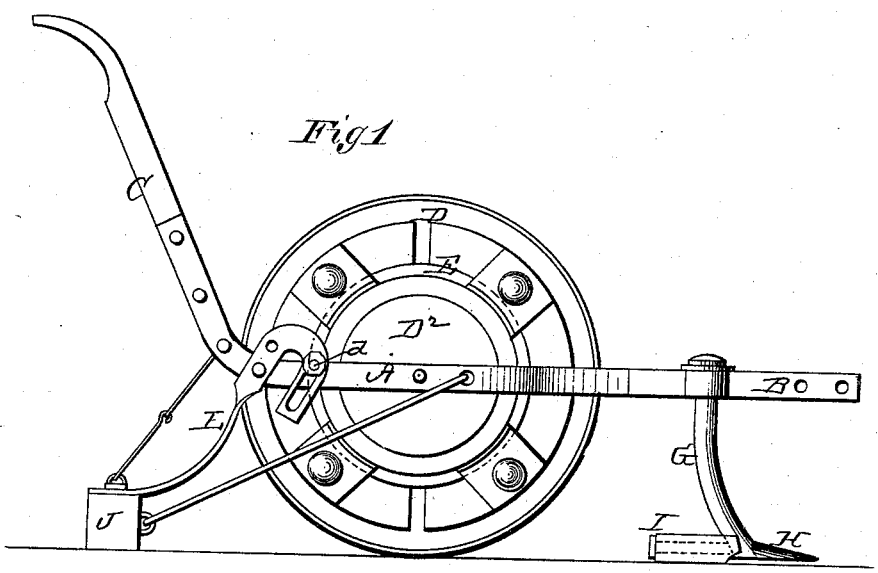
Figure 2:
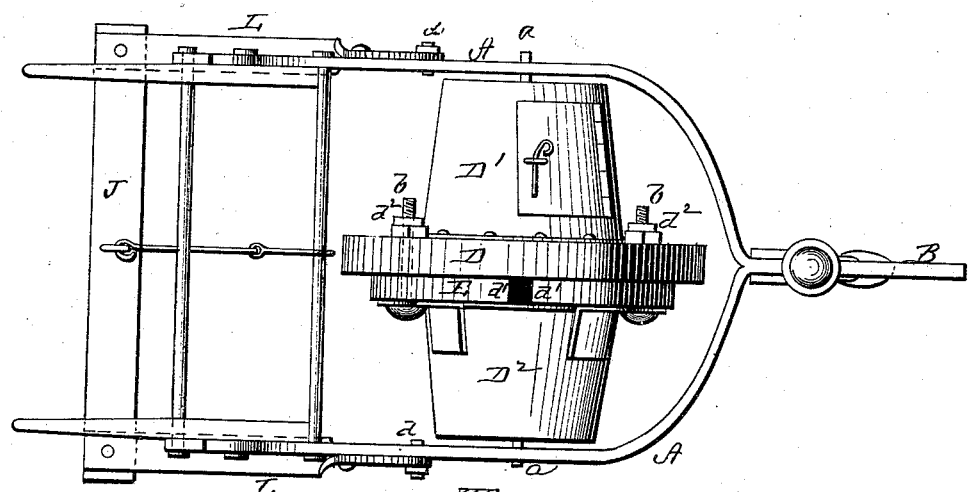
Figure 3:
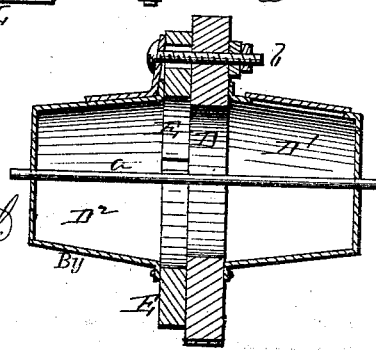

Figure 1 is a side elevation of my machine. Fig. 2 is a plan view of the same. Fig. 3 is a longitudinal section of the seed-drum.

A represents the frame of my planter, forming a tongue, B, at the front end, to which the team is to be hitched. The rear end of the frame is curved upward, and two handles, C C, are suitably secured thereto. In the frame A is placed a horizontal shaft, $a$, revolving in suitable bearings formed therein, and on one end of this shaft is secured a half-drum, $D^1$, to the inner open end of which is fastened an annular ring or wheel, D, which is run in the furrow made by the furrow-opener in front. On the other side of the rim or wheel D is placed another half-drum, $D^2$, fastened to the wheel by four bolts, $b\ b$, as shown, said bolts passing through ears or projections on the said half-drum $D^2$. Between the half-drum $D^2$ and wheel or rim D are placed four segmental blocks, E E, fastened by the bolts $b\ b$, and leaving spaces or openings $d^1\ d^1$ between them, through which the corn passes out and is deposited in the ground. The holes in the blocks E, through which the bolts $b$ pass, are made elongated, as shown in Fig. 3, so that said blocks may be moved radially outward and inward, to regulate the size of the apertures $d$.

For planting cotton or other seed, and for distributing fertilizer, the segments E are removed, and rubber washers $d^2\ d^2$ are placed on the bolts between the wheel D and half-drum $D^2$. The planter is regulated to plant any amount of seed required by tightening or loosening the bolts $b$, so as to lessen or increase the size of the space between the wheel and half-drum, the rubber washers admitting of said expansion and contraction of the space.

Through the tongue B is passed a vertical shank, G, on the lower end of which is formed the furrow-opener H, and in rear of said opener is a block, I, that smooths the opened furrow. J represents the coverer, attached to two spring-arms, L L, which are pivoted to the frame A, one on each side, and their upper ends are curved, as shown in Fig. 1, and slotted with a bolt, $d$, passing through each slot, and a hole in the frame whereby the coverer may be adjusted up and down, as required.

For rough land the springs are made to bear down on the coverer, and for smooth land the coverer is raised.

Having thus fully described my invention, what I claim as new, and desire to secure by Letters Patent, is—

1. In combination with the annular rim D and half-drums $D^1\ D^2$, the segmented blocks E, provided with enlarged bolt-holes for radially adjusting the same to increase or diminish the seed-openings, as set forth.

2. The combination of the coverer J, pivoted spring-arms L L, having their upper front ends curved and slotted, as described, and the bolts $d\ d$ for adjusting the coverer, substantially as herein set forth.

In testimony that I claim the foregoing I have hereunto set my hand this 20th day of July, 1875.

WILLIAM HENRY COOK.

Witnesses:
C. L. EVERT,
W. C. MOORE.